Aug. 7, 1928.

K. D. BELL ET AL 1,679,927

MEASURING DEVICE

Filed Dec. 23, 1926

INVENTORS
Kenneth D. Bell
Ernest J. Meinzinger
BY
ATTORNEY

Aug. 7, 1928.  K. D. BELL ET AL  1,679,927

MEASURING DEVICE

Filed Dec. 23, 1926   2 Sheets-Sheet 2

INVENTOR
Kenneth D. Bell
BY Ernest J. Meinzinger
P. W. Pomeroy
ATTORNEY

Patented Aug. 7, 1928.

1,679,927

UNITED STATES PATENT OFFICE.

KENNETH D. BELL, OF SOUTH BEND, INDIANA, AND ERNEST MEINZINGER, OF DEARBORN, MICHIGAN.

MEASURING DEVICE.

Application filed December 23, 1926. Serial No. 156,595.

This invention relates to appliances particularly adapted for use by printers, engravers and other persons working with drawings, photographs or other illustrations to measure such drawings, etc., and determine the proportionate size of the same if enlarged or reduced.

One of the objects of the invention is to provide a gauge or measuring device for use in quickly measuring the sizes of drawings and the like, the gauge being especially adapted for measuring a reduced or enlarged size of the drawing to determine the appropriate size for use in printing it in a predetermined space in a catalogue, magazine, newspaper or the like without requiring any calculating by the user.

Another object is to provide a measuring device having a transparent base provided with a scale thereon adapted to be inserted over the drawing or the like and a straight edge extending from one corner of the base across the scale and diagonally across the drawing whereby the proportionate reduced or enlarged size of the drawing can be determined.

Another object is to provide a measuring device of the character described which has a flexible straight edge or divider adapted to be withdrawn into a casing mounted on the base when desired.

A further object is to provide a measuring device having a transparent base provided with a scale thereon adapted to be inserted over the drawing or the like and having slots formed therein adjacent the edge thereof permitting the marking of the drawing to show the reduced dimensions of the same.

A still further object is to provide a measuring device which has a transparent base having a plurality of scales thereon permitting the user to measure the drawing to determine its reduced or enlarged size in accordance with either of said scales.

With the foregoing and other objects in view which will be apparent from the detailed description to follow, our invention consists in certain novel features of construction and combination of parts which will be readily understood by those skilled in the art.

In the accompanying drawings in which like numerals refer to like parts throughout the several different views, Figure 1 is a top plan view of the preferred form of the device showing the drawing to be measured therebeneath.

Figure 1:
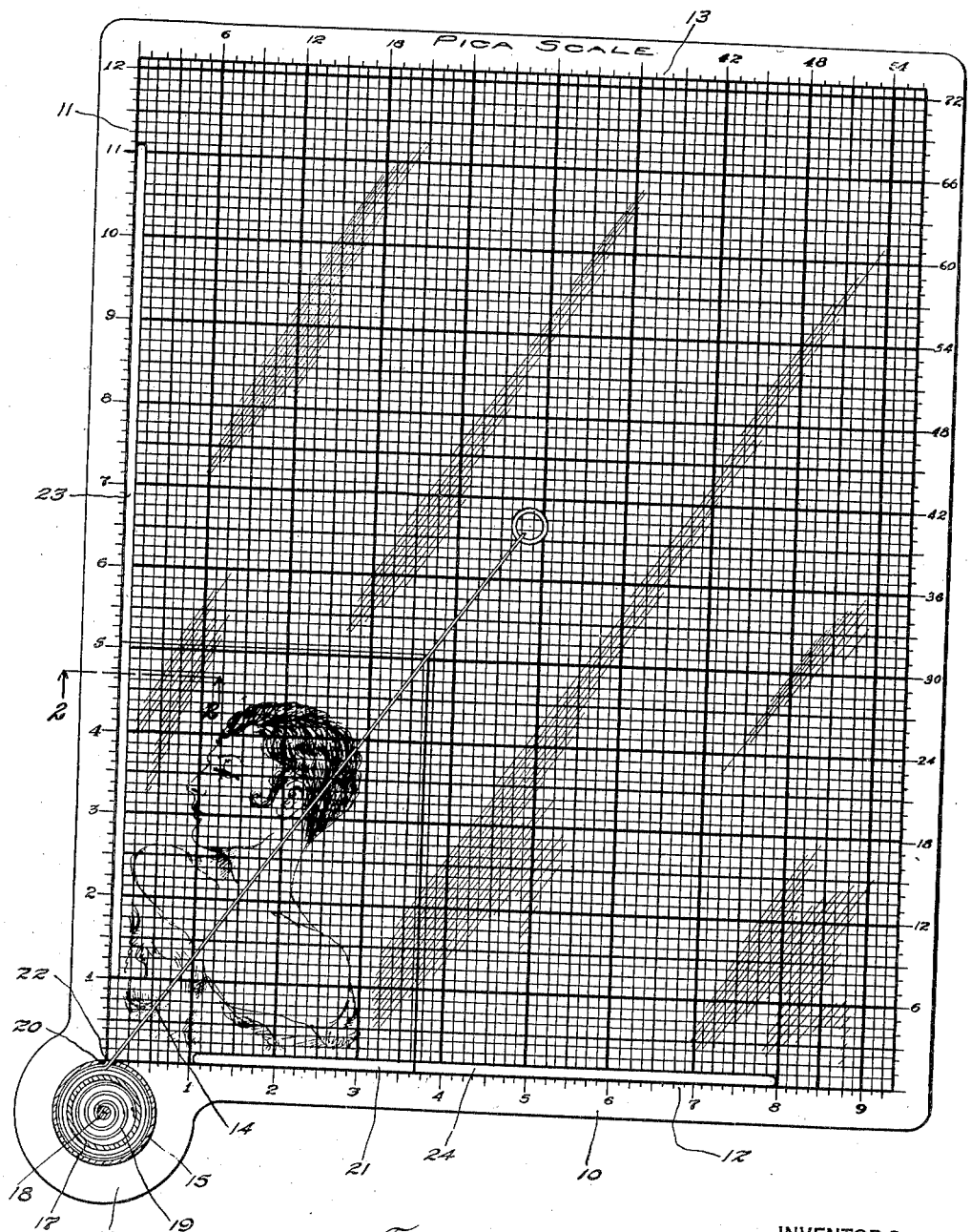
Figure 2:
Figure 2 is a sectional view taken on the line 2—2 of Figure 1.

In the past it has been customary with artists, printers or other persons working with drawings, illustrations and the like to measure the drawing and then calculate the comparative reduced or enlarged size of the same when it was desired to change the dimensions of the drawing for any purpose. This work on the part of the user required considerable time and inconvenience and to those persons not skilled in that kind of work, mistakes were often made in calculating the dimensions of the proposed reduced or enlarged drawing or the like and it is the object of our invention to provide a device whereby the changed size of the drawing can be determined without any mental effort on the part of the user.

The objects and operations of our device will be readily understood from the detailed description to follow. The base 10 which may be made from celluloid or other suitable transparent material has printed or engraved thereon a scale 11 extending vertically from the base, which in the drawings for the purpose of illustration is shown in inches and fractional parts thereof. A second scale 12, which is also illustrated in inches, extends horizontally of the base and the projected lines from the scales 11 and 12 are extended to intersect each other and form rectangular sections on the base. These scales may be of any desired form and as illustrations of a different scale the pica scale 13 is shown at the top and right-hand side of Figure 1. At the lower left-hand corner of the base 10 a straight edge or divider 14, which in Figure 1 is shown as a tape is mounted in a casing 15. The base 10 is enlarged at this point to provide a projection 16 to suitably receive the casing 15 in which is mounted a spool 17 to which one end of the tape 14 is secured. Within the spool 17 is mounted a post 18 on which a coil spring 19 is secured at one end the other end being secured to spool 17. The spool 17 is adapted to rotate in the casing 15 so that the tape 14 can be unwound therefrom when in use and again rewound thereon when not in use. The casing 15 is provided with a slot 20 positioned at the intersection of the scales 11 and 12 and the tape 14 is adapted to extend therethrough to be withdrawn from the casing so that the tape can be drawn diagonally across the scales for a purpose to be hereinafter described. The slot in the casing 15 provides in effect a pivot for the tape 14 so that the tape is free to be moved to any desired position across the scales, it being essential, if the tape is attached at one end, that the same is free to move or pivot about a point at an outer intersection of the scales as described. We have illustrated the drawing 21 positioned beneath the base 10, in the preferred manner so that corner 22 of the scale is coincidental with the lower left-hand corner of the drawing to be measured. Slots 23 and 24 are provided in the base 10 inwardly from the scales 11 and 12 so that the marginal edges of the drawing 21 will not be covered by the base permitting the user to make marks or other notations on the drawing.

As illustrated in Figure 1, the drawing 21 is shown to be about 5 inches high and 3¾ inches wide. If it is desired to reduce the drawing to a predetermined width, say 3 inches, the drawing is placed beneath the base as above described and the tape extended diagonally across the indicia to bisect the drawing. It is only necessary to read the scales on the base at the point where the tape crosses the same to determine the proportionate reduced or enlarged size. It will thus be seen from the description given above that the tape intersects the extended lines of the scales 11 and 12 and that the same intersects the extended line of the scale 12 at the 3 inch point, 4⅛ inches from the base line of the vertical scale 11. Therefore, it will be seen that if desired to reduce the drawing to a 3 inch width that the height thereof would be 4⅛ inches. As a further illustration, if it is desired to reduce the drawing to a height of 4½ inches, the tape is extended to the position shown as above described showing that the width of the drawing would be 3¼ inches. It will also be readily understood that the measurement for the enlargement of the drawing can be determined with equal accuracy and as an illustration, if it is desired to enlarge the drawing shown to a width of 4 inches the height thereof would be 5½ inches.

As hertofore described the marginal edges of the drawing are unobstructed because of the slots 23 and 24 in the base 10 whereby the user can readily make such notations on the marginal edges of the drawing as desired so that when the drawing is removed from beneath the measuring device the notations will be readily apparent.

Figure 3:
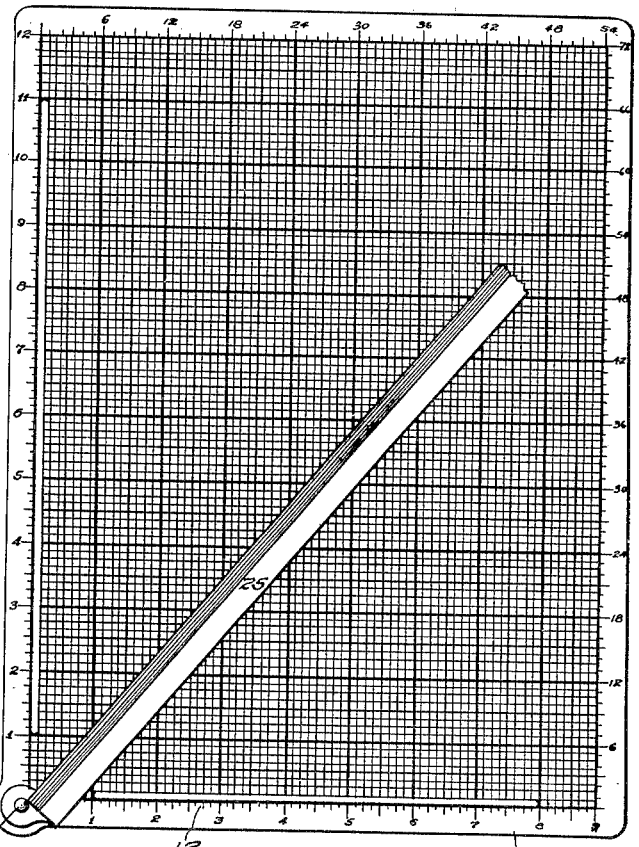
Figure 3 is a plan view showing a modified form of straight edge or divider.

In Figure 3 we have shown a slightly modified form of divider wherein the member 25 is pivoted at 26 to the base 10 at the intersection of the scales 11 and 12 as above defined. The operation of the device as shown in Figure 3 is the same as in the previous views, the major difference being that the divider is not adapted to be automatically wound in a casing when the device is not in use.

Figure 4:
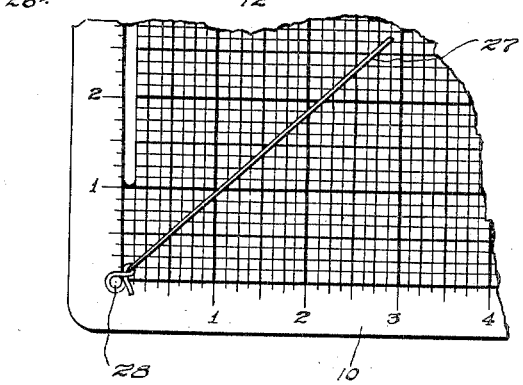
Figure 4 is a fragmentary plan view showing still another form of straight edge or divider.

In Figure 4 we have shown a still further modification which comprises a flexible divider 27 which is secured to a post 28 positioned at the intersection of the scales 11 and 12. In this modification the divider may be a cord or other flexible element which is secured to the post 28 and adapted to pivot thereon, it being essential in any of the three modifications that the divider be pivoted at the intersection of the scales so that the drawing can be actually measured as above described.

It will also be apparent that it is not necessary, although preferable, that the divider be attached to the base, but that a ruler or divider can be used to accomplish the desired result, provided one end of the same is positioned at the intersection of the scales as above described, to measure the drawing in the manner specified.

Aside from the specific embodiments of the invention herein shown and described it will be understood that numerous details of the construction may be altered or omitted without departing from the spirit and scope of this invention, and we do not desire to limit the invention to the exact construction herein set forth, as we desire to claim the invention broadly as well as specifically as indicated in the appended claims.

What we claim is:

1. A device of the class described comprising a transparent base having indicia thereon dividing said base into rectangular sections, a housing secured to said base, and a flexible straight edge mounted in said housing and operable to be withdrawn from said housing diagonally of said base to intersect said indicia.

2. A device of the class described comprising a transparent base having indicia thereon dividing said base into rectangular sections, a housing secured to said base having an opening therein in matching relation with an intersection of said indicia, and a flexible straight edge mounted in said housing and operable to be withdrawn through said opening diagonally across said indicia to intersect said sections.

3. A device of the class described comprising a transparent base having indicia thereon dividing said base into rectangular sections, a housing secured to said base having an opening therein in matching relation with an intersection of said indicia, and a flexible straight edge mounted at one end in said housing and operable to be withdrawn through said opening diagonally across said indicia to intersect said sections, and spring means for returning said straight edge to inoperative position.

4. In a device of the class described, a transparent base, there being two scales on said base dividing the same into rectangular sections, a flexible straight edge pivoted on said base adjacent one corner thereof and adapted to extend diagonally across said scales to intersect said sections, and there being a slot formed in said base at the edge of one of said scales, one of the edges of said slots being in line with the pivot of said straight edge.

5. In a device of the class described, a transparent base, two scales on said base dividing the same into rectangular sections, a flexible straight edge pivoted on said base adjacent one corner thereof positioned to extend diagonally across said scales to intersect said sections, there being slots formed in said base at the edge of said scales, one wall forming an edge of each of said slots being at right angles to each other and the extended lines of said walls intersecting at the point said straight edge intersects said scales.

6. A device of the class described comprising a transparent base having indicia thereon dividing said base into rectangular sections, a housing secured to said base, a spool rotatably mounted within said housing, and a flexible straight edge mounted on said spool and operable to be withdrawn from said housing diagonally of said base to intersect said indicia.

7. A device of the class described comprising a transparent base having indicia thereon dividing said base into rectangular sections, a housing secured to said base, a spool rotatably mounted within said housing, a flexible straight edge mounted on said spool and operable to be withdrawn from said housing diagonally of said base to intersect said indicia, and a spring within said spool operable to return said straight edge to inoperative position.

Signed by us at South Bend, Indiana, this 21st day of December, 1926.

KENNETH D. BELL.
ERNEST MEINZINGER.